US012646980B2

(12) United States Patent
Hurka et al.

(10) Patent No.: US 12,646,980 B2
(45) Date of Patent: Jun. 2, 2026

(54) POWER TOOL AND METHOD FOR OPERATING A POWER TOOL

(71) Applicant: Hilti Aktiengesellschaft, Schaan (LI)

(72) Inventors: Florian Hurka, Margertshausen (DE); Walter Wissmach, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 263 days.

(21) Appl. No.: 18/562,662

(22) PCT Filed: Jun. 9, 2022

(86) PCT No.: PCT/EP2022/065658
§ 371 (c)(1),
(2) Date: Nov. 20, 2023

(87) PCT Pub. No.: WO2022/268513
PCT Pub. Date: Dec. 29, 2022

(65) Prior Publication Data
US 2024/0250566 A1 Jul. 25, 2024

(30) Foreign Application Priority Data

Jun. 23, 2021 (EP) ...................................... 21181111

(51) Int. Cl.
| | |
|---|---|
| *H02K 1/16* | (2006.01) |
| *B25F 5/00* | (2006.01) |
| *H02K 3/12* | (2006.01) |

(52) U.S. Cl.
CPC ................. *H02K 1/16* (2013.01); *B25F 5/00* (2013.01); *H02K 3/12* (2013.01)

(58) Field of Classification Search
CPC ..................... H02K 7/14–16; H02K 11/30–38
(Continued)

(56) References Cited

U.S. PATENT DOCUMENTS 5,631,534 A * 5/1997 Lewis ................. H01M 10/482
320/118
10,833,611 B2 11/2020 Cox et al.
(Continued)

FOREIGN PATENT DOCUMENTS

DE 112017002637 T5 4/2019
JP 2014204574 A 10/2014
(Continued)

OTHER PUBLICATIONS

International Search Report PCT/EP2022/065661 dated Sep. 30, 2022.

(Continued)

*Primary Examiner* — Oluseye Iwarere
*Assistant Examiner* — Minki Chang
(74) *Attorney, Agent, or Firm* — Davidson Kappel LLC

(57) ABSTRACT

A power tool having a motor is provided, wherein the motor includes a rotor and a stator, and wherein the stator includes a first winding and a second winding, wherein the windings are designed in such a way that the windings allow operation of the motor of the power tool at substantially full speed, but at substantially half the power compared with the comparison motor. In the comparison motor, the stator coils are substantially completely wrapped with a continuous wire layer. method for operating such a power tool and a method for carrying out charge equalization between two accumulators in a power tool is also provided. The double-wound stator can be used in conjunction with a bridge circuit made up of motor inverters and stator coils to allow charge equalization between two accumulators in a power tool.

7 Claims, 3 Drawing Sheets

(58) Field of Classification Search
   USPC .................................. 310/50, 66, 68 R, 68 D
   See application file for complete search history.

(56)                    References Cited

U.S. PATENT DOCUMENTS

| | | | |
|---|---|---|---|
| 11,451,078 B2 | 9/2022 | Lei et al. | |
| 2013/0264987 A1* | 10/2013 | Uchida | ................... H02P 25/22 |
| | | | 318/495 |
| 2017/0346334 A1 | 11/2017 | Mergener et al. | |
| 2018/0076745 A1* | 3/2018 | Cox | .......................... B25F 5/02 |
| 2020/0052524 A1 | 2/2020 | Mergener et al. | |

FOREIGN PATENT DOCUMENTS

| | | | |
|---|---|---|---|
| JP | 2019054612 A | 4/2019 |
| WO | WO2012/086852 | 6/2012 |
| WO | WO2012086852 A1 | 6/2012 |
| WO | WO 2022/268513 A1 | 12/2022 |
| WO | WO2022/268514 A1 | 12/2022 |

OTHER PUBLICATIONS

International Search Report PCT/EP2022/065658 dated Sep. 28, 2022.

* cited by examiner

18a

18b

18c

POWER TOOL AND METHOD FOR OPERATING A POWER TOOL

The invention relates to a power tool having a motor, wherein the motor comprises a rotor and a stator. In further aspects, the invention relates to a method for operating such a power tool and to a method for carrying out charge equalization between two accumulators in a power tool.

BACKGROUND OF THE INVENTION

In the prior art, power tools are known with which different types of work can be carried out. For example, hammer drills, chisels, cut-off or angle grinders, screwdrivers or core drills are known in each of which a tool is driven by a motor. A power supply can be provided via a mains connection or with batteries or accumulators.

SUMMARY OF THE INVENTION

A number of applications of such power tools are known, in which high powers are required in order to carry out the corresponding work. In the case of power tools whose power supply is formed by an accumulator, it can happen that the power required for the work exceeds the maximum possible output power of the accumulator. In order to meet this challenge, such power tools are often equipped with an interface for two accumulators in order to be able to provide the desired power with two accumulators that can be connected in series or in parallel.

However, when working with power tools with two accumulators, the following problem can arise: If one of the accumulators is completely or partially discharged, full power cannot be provided for the power tool over the entire working period. As soon as one of the accumulators is completely discharged, no further power can be drawn from the accumulators. It may then be necessary to stop working with the power tool-despite the remaining charge present in one of the two accumulators.

Methods are known in the prior art with which a charge equalization between electrical components in a power tool can be made possible. For example, U.S. Pat. No. 5,631,534 A discloses an arrangement of electronic components to allow charge equalization between batteries connected in series. If such a balancing method is to be implemented at the device or accumulator level, a large number of components are required for such an arrangement, for example various switches, drivers, inductances and current measuring devices. Such arrangements are complex to manufacture and prone to errors.

In addition, the problem is known from the prior art that, with known balancing methods, charge equalization can only take place when the power tool is at a standstill.

An object of the present invention is to overcome the above-described deficiencies and disadvantages of the prior art and to provide an improved power tool having at least two accumulators and a method for operating a power tool, with which charge equalization between the accumulators is to be made possible. A particular concern of the invention is also that the charge equalization should take place in both directions. Those skilled in the art would also appreciate it if a technical solution could be provided with which charge equalization between the accumulators of a power tool can be carried out at least also during operation or while working with the power tool.

The present invention provides a power tool having a motor, wherein the motor comprises a rotor and a stator. The stator comprises a first winding and a second winding, wherein the windings are designed in such a way that the windings allow operation of the motor of the power tool at a speed in the range of a comparison motor, but at substantially half the power compared with the comparison motor, wherein the stator coils of the comparison motor are substantially completely wound with a continuous winding. One possible embodiment of such a double-wound stator is shown in FIG. 1. The individual stator coil pairs are shown in FIG. 2.

In the proposed structure of an electric motor, a rotor is arranged inside the motor, while the stator is arranged around the rotor. The stator can, for example, comprise three stator coil pairs, each of which can consist of a first and a second stator coil. The stator coils can in particular be arranged in a circle around the rotor of the motor of the power tool. It is preferred within the meaning of the invention that the stator coils of a stator coil pair are substantially opposite one another within the stator.

Thus, an arrangement of stator coils can be configured for example such that a first coil of the first coil pair is followed by a first coil of the second coil pair, then the first coil of the third coil pair, then the second coil of the first coil pair, then the second coil of the second coil pair and then the second coil of the third coil pair.

In the context of the invention, an odd number of stator coils can also be provided. The stator of the proposed power tool can, for example, comprise nine stator coils or be designed with nine slots. It is preferred within the meaning of the invention that a topology of the motor of the proposed power tool corresponds to the topology of a conventional motor, with its stator coils being "half the size" of a standard motor, for example. The term "half the size" preferably means in the context of the invention in relation to the stator coils that the wire with which the stator coils are wound has substantially half the diameter of the wire with which the stator coils of a conventional standard motor are wound. In other words, the wire with which the stator coils of the motor of the power tool proposed here are wound is half as thick as the wire with which the stator coils of a conventional comparison motor are wound. In order to compensate for the resulting lower amount of metal or inductive material, it is preferred within the meaning of the invention that the stator coils of the proposed motor are double-wound. For the purposes of the invention, this means, for example, that each tooth of the stator is wrapped twice or with twice the number of windings compared with a conventional standard motor.

It is preferred within the meaning of the invention that the stator coils of the stator are wound identically or substantially identically in the sense that their windings comprise a first wire layer and a second wire layer, with the wire layers being formed in such a way that they allow operation of the motor of the power tool at a speed in the range of the speed of a comparison motor, but at substantially half the power compared with the comparison motor. The operation of the motor at half the power compared with a comparison motor is made possible in particular by the provision of two wire layers present in the stator coils and forming a first and a second winding of the stator of the motor of the power tool.

It is preferred within the meaning of the invention that the stator coils comprise a first wire layer and a second wire layer, the first wire layer preferably being an inner wire layer, while the second wire layer is preferably an outer wire layer. The wire may preferably comprise copper or a copper alloy. The bifilar winding of the stator coils of the proposed motor represents a basic idea of the present invention. The two windings preferably represent two coils which are electrically or galvanically isolated from one another and which together form a stator coil of the motor of the proposed power tool. The two windings, which are electrically or galvanically isolated from one another, are preferably situated around a tooth of the stator.

It is preferred within the meaning of the invention that the first wire layers of two stator coils, which are arranged next to one another in the stator, are electrically conductively connected to one another. In other words, there is an electrically conductive connection between the first wire layers of two adjacent stator coils. For example, a first wire layer of a stator coil of the second stator coil pair can be connected on one side to the first wire layer of a stator coil of the first stator coil pair, while this first wire layer of a stator coil of the second stator coil pair is connected on the other side to the first wire layer of a stator coil of the third stator coil pair. In addition, there can be an electrical connection between each of the first wire layers of a stator.

It is preferred within the meaning of the invention that the stator is wound twice in a substantially identical manner. The provision of a stator with two windings is preferably referred to as a "double-wound stator" within the meaning of the invention. The "double winding" is achieved in particular by the first winding and the second winding of the stator, the windings each comprising a wire layer. The winding with the first wire layer forms the first winding of the stator coil and the winding with the second wire layer forms the second winding of the stator coil. Preferably, each of the windings is designed such that the winding can operate the power tool motor at full speed and half power. The double-wound stator thus acts like two individual motors, which, however, are arranged or wound on a stator. It is preferred within the meaning of the invention that the partial powers of the two windings substantially add up to the total power of a comparison motor, the stator coils of the comparison motor being substantially completely wrapped with a continuous wire layer. In other words, this last subordinate clause preferably means that the full or half power or speed is specified in the context of the present invention in relation to a comparison motor, the notional comparison motor being characterized in that it is substantially completely wrapped with a continuous wire layer.

It is preferred within the meaning of the invention that the first winding of the stator coils is energized by a first inverter, while the second winding of the stator coils is energized by a second inverter, so that the sum of the two windings allows a power in the range of the comparison motor to be provided for the motor of the power tool. In other words, substantially the entire power of a comparison motor can be approached if the windings of the stator are each energized by an inverter. Preferably, each winding contributes substantially half of the total power of a comparison motor. In other words, the contribution of each of the two winding layers is approximately 50% of the power of the comparison motor.

The proposed power tool can preferably also have more than two inverters. For example, the power tool can have 3, 4 . . . or n inverters, the contribution to the motor power of the proposed power tool then being 33%, 25% or $1/n \cdot 100\%$.

It is preferred within the meaning of the invention that the comparison motor does not comprise two windings or two wire layers, but only one winding and one wire layer that forms the winding. It is preferred within the meaning of the invention that the stator comprises three stator coil pairs. The motor of the power tool preferably has at least two motor phases.

It is preferred within the meaning of the invention that the motor is a brushless motor. In the context of the present invention, it is preferably an electronically commutated motor, which is preferably also referred to as an "EC motor" within the meaning of the invention. The rotor of the motor of the proposed power tool can have an armature field via brushes, for example. For example, in the context of the present invention, n individual accumulator electronics of known power tools that have only one accumulator can be connected to one another via a brushless motor that has an n-fold wound stator according to the invention. In an exemplary embodiment of the invention, two individual accumulator electronics can be connected to one another via the EC motor with a double-wound stator in order to double the power of the motor. As a result, cost-optimized new power tool electronics can be obtained, since such individual accumulator electronics are available at low cost due to the large quantities. It is preferred within the meaning of the invention that the subsystems made up of submotors, one accumulator each, one inverter and electronics share the magnetic flux in the sheet metal of the stator of the overall motor. A power tool can preferably comprise n subsystems, with a subsystem comprising an accumulator, electronics and a winding in the motor. Consequently, a power tool with n subsystems comprises n accumulators, n electronics and n windings in the motor. In other words, the numbers of subsystems, accumulators, electronics and windings in the motor of the power tool correspond, with the subsystems or their components sharing the magnetic flux in the stator iron.

In a second aspect, the invention relates to a method for operating a power tool, wherein the first winding of the stator coils is energized by a first inverter, while the second winding of the stator coils is energized by a second inverter, so that a power in the range of the comparison motor is provided for the motor of the power tool. The definitions, technical effects and advantages described for the proposed power tool apply analogously to the proposed operating method. It is particularly preferred within the meaning of the invention that the full power of the motor can be provided by energizing the windings through the two inverters, with this full power preferably corresponding to the full power of the comparison motor. In addition to the first and the second inverter, further inverters, for example three or four inverters, can be provided.

In one embodiment of the invention, two stand-alone or independent inverters are connected in series with one another via the motor of the power tool. It is preferred that the inverters are arranged between the motor and in each case one of the two separate accumulators. In other words, in this preferred embodiment of the invention, the first accumulator, the first inverter, the motor, the second inverter and the second accumulator can be connected to one another in series. In particular, when the accumulators have different voltage levels or charge states, charge equalization results in the context of the present invention. Usually, the accumulator with a lower filling level also has a lower voltage level. As a result, charge or an electrical equalizing current can flow from the fuller accumulator with the higher voltage level in the direction of the other accumulator, which has a lower charge state and a lower voltage level, for example.

It is preferred within the meaning of the invention that the power tool comprises a first accumulator and a second accumulator. More than two accumulators can also be provided, with two accumulators usually being assumed in this document for better legibility. With the double-wound stator proposed in the context of the present invention, charge equalization between the accumulators of the power tool can be carried out in a particularly simple manner. In particular, it is possible for the charge equalization to take place in both directions. It is preferred within the meaning of the invention to increase the charge of the emptier accumulator to the filling level of the fuller accumulator. This can be done, for example, by asymmetrically drawing charge from the accumulators. The asymmetrical drawing of charge preferably means within the meaning of the invention that the fuller accumulator has a share of 70% of the total power to be provided, for example, while the emptier accumulator has a share of 30% of the total power. During this process, both accumulators continue to empty, but to different extents. As a result, a uniform filling level of the at least two accumulators can be achieved after a certain period of time.

It can also be preferred within the meaning of the invention that one of the accumulators is filled by one part-motor, i.e. the motor whose stator coil is formed by one of the two windings, working against the other part-motor. In other words, in this exemplary embodiment of the invention, one inverter side works against the other inverter side, so that one part-motor is braked slightly. This preferably means that the first part-motor is in generator mode, so that its accumulator can be charged.

It is preferred within the meaning of the invention that the charge equalization between a first accumulator and a second accumulator of the power tool can take place in both directions. This charge equalization on both sides can take place in particular when the power tool is at a standstill.

The two-sidedness of the charge exchange or its bidirectionality is achieved in particular in that the two windings of the stator together with the inverters assigned to them form a complete H-bridge or a bridge circuit. In the context of the present invention, use is made of the fact that this bridge circuit behaves like a bidirectional direct current/direct current converter (DC-DC converter), in particular like a buck/boost DC-DC converter, with such a direct current/direct current converter being able to "pump", i.e. convey, current or electrical energy in both directions. It is preferred within the meaning of the invention that the inductance required for charge equalization is provided by the stator coils of the motor of the power tool. Similar to a transformer, the electrical energy is transferred from one winding to the other winding. In this way, any charge differences or different charge states of the accumulators of the power tool can be equalized. The charge equalization described when the power tool is at a standstill can be made possible in particular by using the motor of the power tool as a direct current/direct current converter (DC-DC converter).

It is preferred within the meaning of the invention that the first accumulator has a first charge state and the second accumulator has a second charge state, with the charge states being able to be equalized by means of the charge equalization described above, in particular with the aid of the bridge circuit, when the power tool is at a standstill. For example, if the first charge state of the first accumulator is 75% and the second charge state of the second accumulator is 25%, charge equalization can be carried out with the invention with the aim that at its end both accumulators have a charge state of around 50%. In particular, charge equalization carried out in this way enables the power tool to be used effectively for longer because the charges can be better distributed within the accumulators and can thus be utilized. In particular, the situation is avoided in which work with the power tool has to be ended although one of the accumulators is still well charged.

It is preferred within the meaning of the invention that each accumulator is assigned an inverter, with charge equalization between an accumulator with a higher charge state and an accumulator with a lower charge state taking place in that the accumulator with the lower charge state is transferred from an operating mode to a generator mode by the inverter assigned to it. As a result, the capacity of the accumulator with the higher charge state can advantageously be tapped, so that charge equalization occurs. The transfer of the less charged accumulator from the operating mode to the generator mode can take place in particular in that a small braking torque is imparted to the inverter of the less charged accumulator. This method for carrying out charge equalization between the accumulators of a power tool can advantageously also be carried out during operation, i.e. when working with the power tool, for which there have hitherto not been any technically satisfactory solutions in the prior art.

FIG. 3 shows a preferred embodiment of the invention, for example, in which the first winding is connected to a first accumulator via a first inverter, while the second winding is connected to a second accumulator via a second inverter. With the circuit shown in FIG. 3, charge equalization can advantageously be made possible both during operation and when the power tool is at a standstill.

An advantage of the proposed invention is that the two inverters can be designed for a simple accumulator voltage. This is particularly advantageous when working with small voltages.

Another significant advantage of the invention is that if one side of the power tool fails or an accumulator is empty, work can continue with half the torque compared with an intact power tool with two at least partially charged accumulators.

In a third aspect, the invention relates to a method for carrying out charge equalization between two accumulators in a power tool, the power tool comprising a first inverter for energizing first stator coils and a second inverter for energizing second stator coils, the inverters forming a bridge circuit with the stator coils that is set up to carry out charge equalization between the accumulators of the power tool. The definitions, technical effects and advantages described above apply analogously to the proposed balancing or charge equalization method. It is preferred within the meaning of the invention that the stator coils form a stator that has a first winding and a second winding, with charge equalization being achieved by electrical energy being transferred from the first winding to the second winding of the stator, or vice versa.

BRIEF DESCRIPTION OF THE DRAWINGS

Further advantages will become apparent from the following description of the figures. An exemplary embodiment of the present invention is depicted in the figures. The figures, the description and the claims contain numerous features in combination. A person skilled in the art will expediently also consider the features individually and combine them to produce useful further combinations.

Identical and similar components are denoted by the same reference signs in the figures, in which.

DETAILED DESCRIPTION

Figure 1:
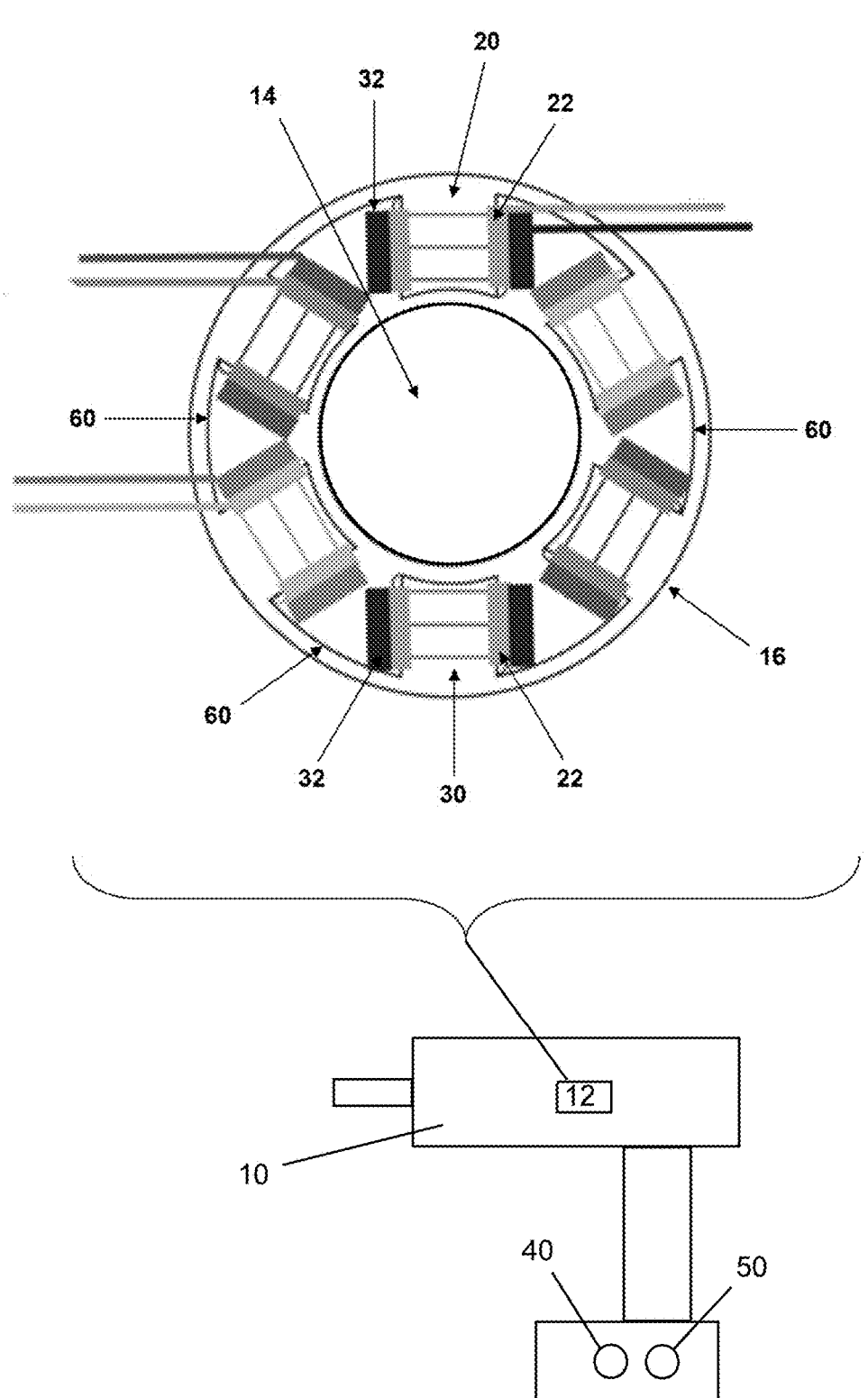
FIG. 1 shows an exemplary embodiment of a double-wound stator according to a preferred embodiment of the invention

FIG. 1 shows an exemplary embodiment of the proposed motor 12 of the power tool 10, with a power tool 10 not being shown solely schematically in the figures. In FIG. 1 there can be seen the rotor 14 and the stator 16 of the motor 12 of the power tool 10, which is preferably a brushless electric motor. The stator 16 comprises a series of stator coils 20, 30 which can be arranged in pairs, for example, or can form stator coil pairs 18. In each case one group of stator coils can preferably be referred to as first stator coils 20 and the other group of stator coils can preferably be referred to as second stator coils 30. The stator 16 of the motor 12 of the power tool 10 comprises a first winding 70 and a second winding 80, the windings 70, 80 each comprising a wire layer 22, 32 (see, e.g, FIG. 3). It is preferred within the meaning of the invention that the first winding 70 comprises a first wire layer 22, while the second winding 80 comprises a second wire layer 32. Each stator coil 20, 30 preferably comprises a first wire layer 22 and a second wire layer 32, the first wire layers 22 of the stator coils 20, 30 forming the first winding 70 of the stator 16, while the second wire layers 32 of the stator coils 20, 30 form the second winding 80 of the stator 16. Each of the two windings 70, 80 allows the power tool 10 to be operated in such a way that full speed can be achieved, but only half the power compared with the operation of a comparison motor. The comparison motor substantially corresponds to the proposed motor, but the stator of the comparison motor has only one winding, i.e. one wire layer. Preferably, each of the two windings 70, 80 of the proposed double-wound stator 16 is energized by an inverter 24, 34, with the first winding 70 of the stator 16 of the motor 12 of the power tool 10 being energized by the first inverter 24, while the second winding 80 of the stator 16 of the motor 12 of the power tool 10 is energized by the second inverter 34.

As a result, the total power of the motor 12 can advantageously be approached, with each winding layer 70, 80 contributing approximately 50% to the power of the motor 12.

In addition, FIG. 1 shows the electrical lines 60, which can exist between the first wire layers 22 of adjacent stator coils 20, 30 in each case. Electrical lines can be arranged on the inside of the stator 16 and in each case connect the first wire layers 22 within a stator coil 20, 30 to one another. The inside of the stator 16 preferably faces the rotor 14 of the motor 12 of the power tool 10, since the rotor 14 of the motor 12 of the power tool 10 is arranged inside the motor 12 of the power tool 10. The interconnection shown in FIG. 1 is only one exemplary embodiment of the invention among many other possibilities. The lines coming from the windings 70, 80 go to one each of the inverters 24, 34 (see, e.g, FIG. 3). The motor 12 of the power tool 10 can also be an external rotor motor.

Figures 2A, 2B, 2C:
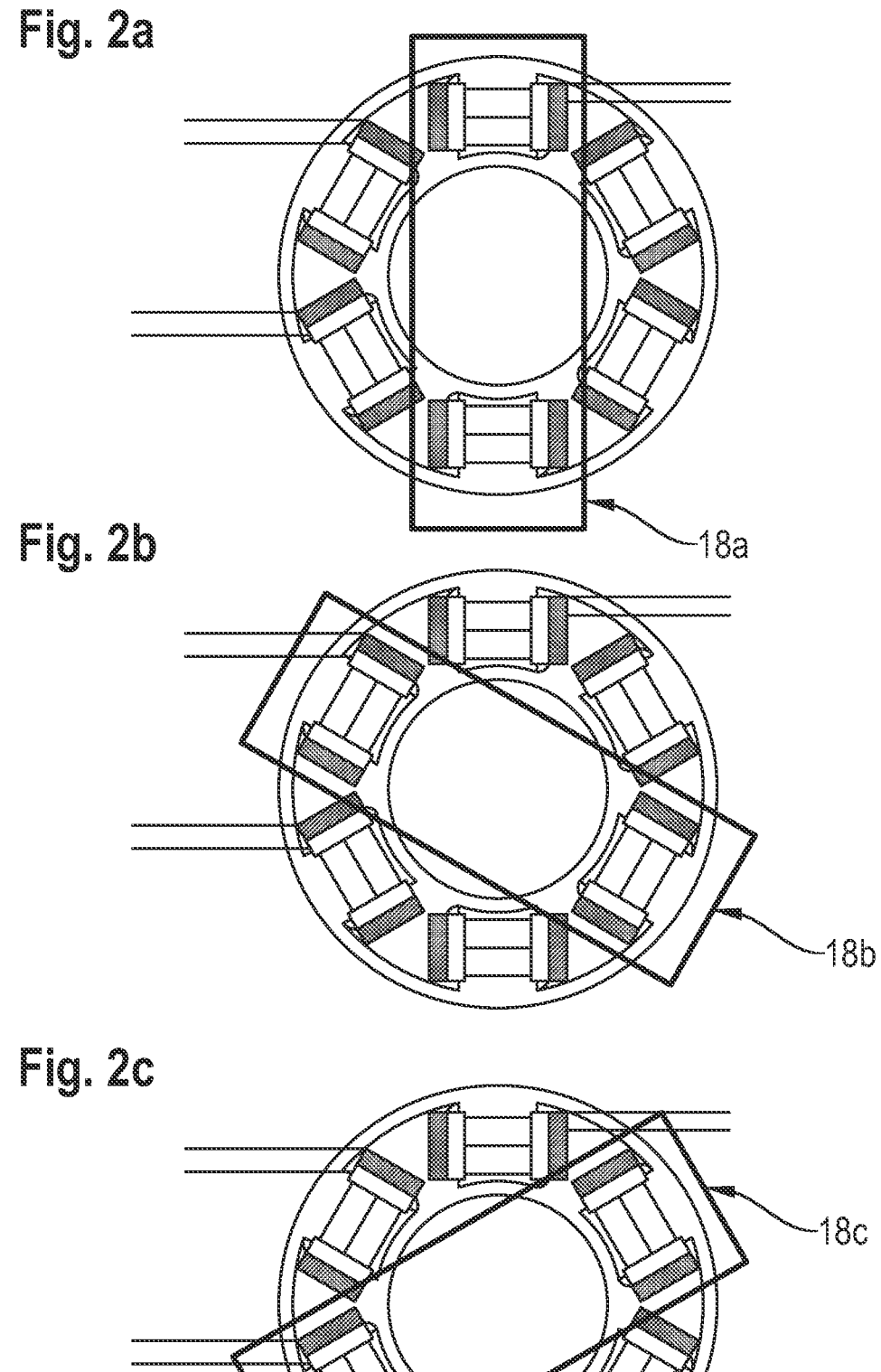
FIGS. 2*a*, 2*b*, 2*c* show an illustration of a possible embodiment of the stator with three stator coil pairs

FIGS. 2a, 2b, 2c show a possible embodiment of the stator 16 of the motor 12 of the power tool 10 with three stator coil pairs 18. Each stator coil pair 18 preferably comprises a first stator coil 22 and a second stator coil 32, with this first stator coil 22 and the second stator coil 32, which together form a stator coil pair 18, preferably being situated opposite one another in the stator 16 of the motor 12 of the power tool 10. The three stator coil pairs 18 are designated as stator coil pairs 18a, 18b and 18c in FIGS. 2a, 2b and 2c.

Figure 3:
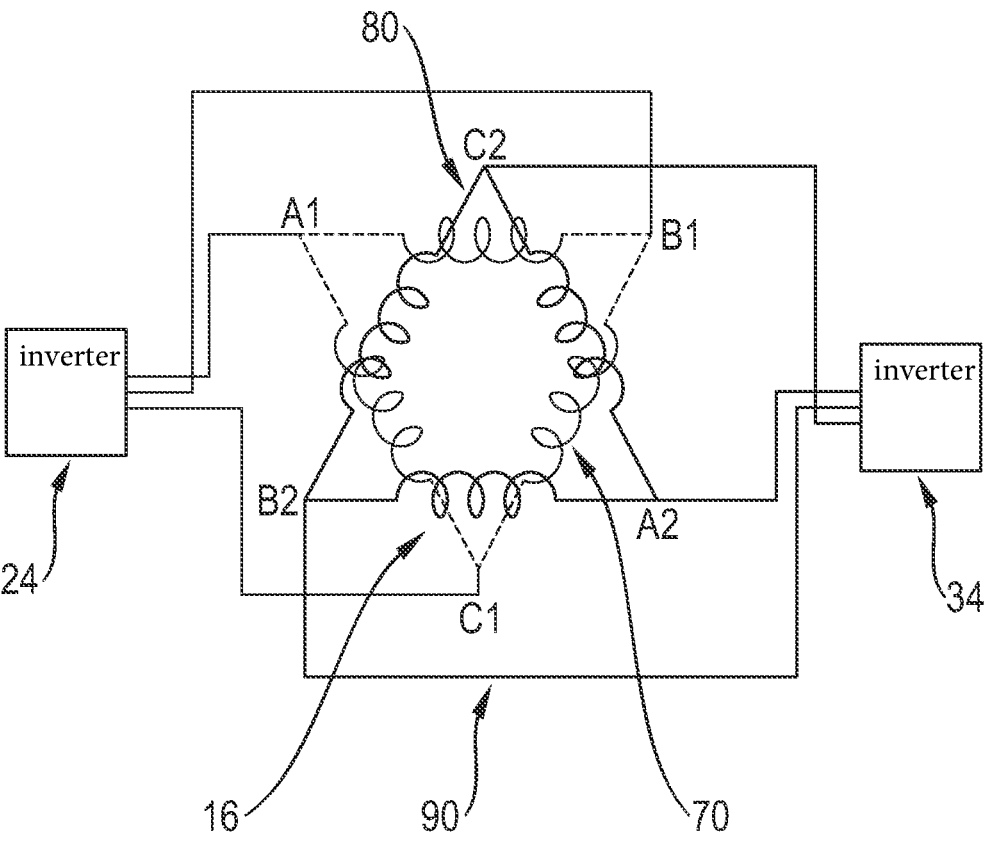
FIG. 3 shows an exemplary circuit diagram for a double-wound stator with two accumulators

FIG. 3 shows a circuit diagram for a preferred embodiment of the proposed double-wound stator 16 with the two inverters 24, 34. The stator 16 of the motor 12 of the power tool 10 is shown in the center of FIG. 3. The letters A, B, C stand for the three stator coil pairs 18a, 18b and 18c, while the numbers 1 and 2 indicate whether it is the first stator coil 22 or the second stator coil 32 of a stator coil pair 18. In other words, the stator coils A1, B1, C1 form the first stator coils 22 of the stator coil pairs 18, while the stator coils A2, B2 and C2 form the second stator coils 32 of the stator coil pairs 18. The first stator coils A1, B1, C1 are preferably connected to the first inverter 24, while the second stator coils A2, B2 and C2 are preferably connected to the second inverter 34. It is preferred within the meaning of the invention that the inverters 24, 34 and the stator coils 20, 30 form a bridge circuit 90 or an H-bridge, with charge equalization between the accumulators 40, 50 of the power tool 10 being able to be allowed via this bridge circuit 90. The accumulators 40, 50 are shown solely schematically in the figures (see e.g. FIG. 1). This is possible in particular because the motor 12 of the power tool 10 is used as a direct current/direct current converter. This allows electrical energy to be transferred from the first winding 70 of the stator 16 to the second winding 80 of the stator 16, or vice versa. Owing to the possibility of transferring electrical energy from one winding 70 of the stator 16 to another winding 80, the energy can also be transferred from one accumulator 40 to the other accumulator 50, so that any charge differences can be equalized. This method for charge equalization can be carried out in particular when the power tool 10 is at a standstill. Its particular advantage is that electrical energy can be transmitted in both directions.

With the proposed invention of the double-wound stator 16, charge equalization can also be carried out during the operation of the power tool 10. For this purpose, the inverter (e.g.: 24), which is connected to the accumulator to be charged, can be switched over from motor operation to generator operation. As a result, the capacity of the fuller accumulator (e.g.: 50) can be used to recharge the accumulator (e.g.: 40) with the lower charge state. This method can be made possible in particular by imparting a small braking torque. This braking operation can be used to generate electrical energy, in which case the electrical energy can preferably be used to charge the accumulator with the lower charge state. In particular, its capacity can be charged with the electrical energy generated. This double feed means that virtually two motors can be controlled independently of one another, with one part-motor being able to work against the other part-motor and brake it. As a result, one part-motor can advantageously go into generator mode and charge its accumulator. It is preferred within the meaning of the invention that in FIG. 3 each of the two coil triangles represents a part-motor. In other words, one of the coil triangles represents the first part-motor 20, 24, 70 of the proposed power tool 10, while the other coil triangle represents the second part-motor 30, 34, 80 of the proposed power tool 10.

LIST OF REFERENCE SIGNS

10 Power tool
12 Motor of the power tool
14 Rotor
16 Stator
18 Stator coil pair
20 First stator coil
22 First wire layer
24 First inverter 30 Second stator coil
32 Second wire layer
34 Second inverter
40 First accumulator
50 Second accumulator
60 Electrical line
70 First winding
80 Second winding
90 H-bridge or bridge circuit

What is claimed is:

1. A method for carrying out charge equalization between two accumulators in a power tool, the power tool having a first inverter for energizing first stator coils and a second inverter for energizing second stator coils, the first and second inverters forming a bridge circuit with the first and second stator coils, the method comprising carrying out via the bridge circuit charge equalization between the first and second accumulators, the first and second stator coils forming a stator having a first winding and a second winding, wherein the charge equalization takes place in that electrical energy is transmitted from the first winding to the second winding of the stator, or vice versa.

2. The method as recited in claim 1 wherein the power tool includes a motor, the motor including a rotor and the stator.

3. The method as recited in claim 2 wherein the first winding includes a first wire layer and the second winding includes a second wire layer, each of the first and second stator coils including the first wire layer and the second wire layer.

4. The method as recited in claim 2 wherein the motor is a brushless motor.

5. The method as recited in claim 1 wherein the first stator coils and the second stator coils are opposite one another within the stator.

6. The method as recited in claim 1 wherein the first stator coils include at least three first stator coils and the second stator coils include at least three second stator coils.

7. The method as recited in claim 1 wherein the two accumulators include a first accumulator and a second accumulator, the first and second accumulators being assigned respectively to the first and second inverters, the charge equalization between the first or second accumulator with a higher charge state and the other of the first and second accumulators with a lower charge state taking place in that the other of the first and second accumulators with the lower charge state is transferred from an operating mode to a generator mode by the assigned first or second inverter.

*    *    *    *    *